United States Patent
Park et al.

(10) Patent No.: US 9,538,512 B2
(45) Date of Patent: Jan. 3, 2017

(54) APPARATUS AND METHOD FOR TRANSMITTING AND RECEIVING CONTROL INFORMATION IN A WIRELESS COMMUNICATION SYSTEM

(71) Applicant: LG ELECTRONICS INC., Seoul (KR)

(72) Inventors: Kyu Jin Park, Anyang-si (KR); Jaehoon Chung, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/920,470

(22) Filed: Oct. 22, 2015

(65) Prior Publication Data

US 2016/0044657 A1    Feb. 11, 2016

Related U.S. Application Data

(63) Continuation of application No. 14/567,635, filed on Dec. 11, 2014, now Pat. No. 9,198,173, which is a
(Continued)

(30) Foreign Application Priority Data

Mar. 10, 2011  (KR) ........................ 10-2011-0021276

(51) Int. Cl.
*H04W 72/04*    (2009.01)
*H04L 1/18*     (2006.01)
(Continued)

(52) U.S. Cl.
CPC ........... *H04W 72/0413* (2013.01); *H04B 7/15* (2013.01); *H04B 7/155* (2013.01); *H04L 1/06* (2013.01); *H04L 1/1812* (2013.01); *H04L 1/1854* (2013.01); *H04L 1/1861* (2013.01); *H04L 5/0055* (2013.01); *H04W 72/042* (2013.01); *H04L 5/0007* (2013.01); *H04L 27/2602* (2013.01); *H04L 2001/0097* (2013.01)

(58) Field of Classification Search
None
See application file for complete search history.

(56) References Cited

U.S. PATENT DOCUMENTS 9,204,426 B2 *  12/2015  Lin ....................... H04L 1/1861
2010/0232382 A1 *  9/2010  Gauvreau et al. ............ 370/329
(Continued)

OTHER PUBLICATIONS

LG Electronics, "Consideration on R-PDCCH multiplexing scheme", 3GPP TSG RAN WG1 #59bis, R1-100225, Jan. 18-22, 2010.
(Continued)

*Primary Examiner* — Hong Cho
(74) *Attorney, Agent, or Firm* — Dentons US LLP (57) ABSTRACT

Disclosed are an apparatus and a method for transmitting/receiving control information in a wireless communication system. In a repeater according to the present invention, a receiving antenna can receive control information for a hybrid automatic repeat reQuest ACKnowledgement (HARQ ACK) feedback on the data transmission of a base station from the base station through higher layer signaling. On the basis of the control information, a processor can determine a resource in an upper link control channel to be used for the transmission of the HARQ feedback. A transmitting antenna can transmit the HARQ feedback to the base station through the resource that has been determined.

18 Claims, 7 Drawing Sheets

Related U.S. Application Data continuation of application No. 13/635,271, filed as application No. PCT/KR2011/001758 on Mar. 14, 2011, now Pat. No. 8,934,415.

(60) Provisional application No. 61/315,373, filed on Mar. 18, 2010, provisional application No. 61/314,141, filed on Mar. 15, 2010.

(51) Int. Cl.

| | | |
|---|---|---|
| *H04B 7/155* | (2006.01) | |
| *H04L 1/06* | (2006.01) | |
| *H04B 7/15* | (2006.01) | |
| *H04L 5/00* | (2006.01) | |
| *H04L 27/26* | (2006.01) | |
| *H04L 1/00* | (2006.01) | |

(56) References Cited

U.S. PATENT DOCUMENTS

| | | | |
|---|---|---|---|
| 2010/0296431 A1* | 11/2010 | Terry et al. | 370/315 |
| 2011/0110246 A1* | 5/2011 | Damnjanovic et al. | 370/252 |
| 2011/0134774 A1* | 6/2011 | Pelletier | H04W 52/365 370/252 |
| 2011/0158351 A1* | 6/2011 | Gorokhov | H04B 7/0417 375/316 |
| 2011/0243066 A1* | 10/2011 | Nayeb Nazar et al. | 370/328 |
| 2012/0170504 A1* | 7/2012 | Hoymann et al. | 370/312 |
| 2012/0300711 A1* | 11/2012 | Wang | H04L 5/0091 370/329 |
| 2013/0329678 A1* | 12/2013 | Pan et al. | 370/329 |

OTHER PUBLICATIONS

LG Electronics, "Consideration on Uplink Backhaul Channels in LTE-A", 3GPP TSG RAN WG1 #59bis, R1-100232, Jan. 18-22, 2010.

Samsung, "R-PDCCH multiplexing and search space", 3GPP TSG RAN WG1 #59bis, R1-100135, Jan. 18-22, 2010.

CATT, "Design of Relay Backhaul Control Channels in LTE-A", 3GPP TSG RAN WG1 #59bis, R1-100026, Jan. 18-22, 2010.

* cited by examiner

FIG. 7

APPARATUS AND METHOD FOR TRANSMITTING AND RECEIVING CONTROL INFORMATION IN A WIRELESS COMMUNICATION SYSTEM

This application is a continuation of U.S. patent application Ser. No. 14/567,635, filed Dec. 11, 2014, which is a continuation of U.S. patent application Ser. No. 13/635,271 (issued as U.S. Pat. No. 8,934,415), filed Nov. 26, 2012, which is a 35 U.S.C. §371 National Stage Entry of International Application No. PCT/KR2011/001758 filed Mar. 14, 2011, which claims benefit of and priority to U.S. Provisional Application Nos. 61/314,141 filed Mar. 15, 2010 and 61/315,373, filed Mar. 18, 2010, and Korean Patent Application No. 10-2011-0021276 filed Mar. 10, 2011, all of which are incorporated by reference for all purposes as if fully set forth herein.

TECHNICAL FIELD

The present invention relates to wireless communication, and more particularly, to an apparatus and method for transmitting and receiving control information.

BACKGROUND ART

When the channel state between an evolved Node B (eNB) and a User Equipment (UE) is poor, a Relay Node (RN) is installed between them to provide a better radio channel to the UE. In addition, use of an RN at a cell area where a channel from an eNB is in poor state can provide a high-speed data channel and extend cell service coverage. RNs have been introduced to eliminate shadowing areas and are widely deployed in a wireless communication system.

Conventionally, relaying was confined to the function of a repeater that simply amplifies a signal and forwards the amplified signal. However, more intelligent relay schemes have recently been developed. Furthermore, relaying is a requisite technology to reduce eNB installation cost and backhaul maintenance cost, while extending service coverage and increasing data throughput in a future-generation mobile communication system. Along with the growth of relaying techniques, there exists a need to support an RN used in a conventional wireless communication system for a new wireless communication system.

In a $3^{rd}$ Generation Partnership Project (3GPP) Long Term Evolution-Advanced (LTE-A) system, an RN should transmit a Hybrid Automatic Repeat reQuest (HARQ) feedback in response to data transmission from an eNB. However, resources for use in HARQ feedback transmission from an RN have not been specified so far. As a result, HARQ feedback transmissions from an RN and a UE may collide, thereby remarkably degrading communication performance.

DISCLOSURE

Technical Problem

An object of the present invention devised to solve the conventional problem is to provide a method for receiving control information from an eNB at an RN.

Another object of the present invention is to provide an RN for receiving control information from an eNB.

Another object of the present invention is to provide a method for transmitting control information to an RN at an eNB.

A further object of the present invention is to provide an eNB for transmitting control information to an RN.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for receiving control information at a Relay Node (RN) in a wireless communication system includes receiving, from an evolved Node B (eNB), control information for a Hybrid Automatic Repeat reQuest (HARQ) ACKnowledgment (ACK) feedback corresponding to from an evolved Node (eNB) by higher-layer signaling, and transmitting, the HARQ feedback on an uplink control channel based on the control information, to the eNB. The control information includes information about a resource of the uplink control channel for transmission of the HARQ feedback.

The uplink control channel may be a Physical Uplink Control CHannel (PUCCH) and the information about resources of the uplink control channel may be indicated by the index of a Control Channel Element (CCE). The information about resource of the uplink control channel may be RN-specific.

In another aspect of the present invention, a method for transmitting control information at an eNB in a wireless communication system includes transmitting, to an RN, control information for a HARQ ACK feedback corresponding to data transmission from the eNB through an higher-layer signaling, and receiving, the HARQ feedback through a resource of an uplink control channel indicated by the control information, from the RN.

In another aspect of the present invention, an RN for receiving control information in a wireless communication system includes a reception antenna configured to receive, from an eNB, control information for an HARQ ACK feedback corresponding to data transmission from the eNB through an higher-layer signaling, a processor configured to determine a resource of an uplink control channel to be used for transmitting the HARQ feedback based on the control information, and a transmitting antenna configured to transmit the HARQ feedback in the determined resource.

According to a further aspect of the present invention, an eNB for transmitting control information in a wireless communication system includes a transmission antenna configured to transmit, to an RN, control information for a HARQ ACK feedback corresponding to data transmission from the eNB through an higher-layer signaling, and a reception antenna configured to receive, the HARQ feedback through the resource of an uplink control channel indicated through the control information, from the RN.

Advantageous Effects

According to various embodiments of the present invention, even though an RN and a UE transmit HARQ feedbacks on Physical Uplink Control Channels (PUCCHs), the HARQ feedbacks do not collide with each other, thus remarkably increasing communication performance.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, while the following detailed description is given under the assumption that a 3$^{rd}$ Generation Partnership Project (3GPP) Long Term Evolution/Long Term Evolution-Advanced (LTE/LTE-A) system is being used as a mobile communication system, the description is applicable to any other wireless communication system except for specific features inherent to the 3GPP LTE/LTE-A system.

In some instances, known structures and devices are omitted or are shown in block diagram form, focusing on important features of the structures and devices, so as not to obscure the concept of the invention. The same reference numbers will be used throughout this specification to refer to the same parts.

In the following description, a terminal generically refers to a mobile or fixed user terminal device such as a User Equipment (UE), a Mobile Station (MS), an Advanced Mobile Station (AMS), etc. and a Base Station (BS) generically refers to any node at an end of a network, which communicates with a UE, such as a Node B, an evolved Node B (eNode B or eNB), an Access Point (AP). While the present invention will be described below in the context of a 3GPP LTE/LTE-A system, the contents of the present invention are also applicable to other communication systems.

In a mobile communication system, a UE can receive information from an eNB on downlink and transmit data to the eNB on uplink. Information transmitted from or received at the UE includes data and various types of control information. There are many physical channels depending on the types and usages of information transmitted from or received at UEs.

Figure 1:
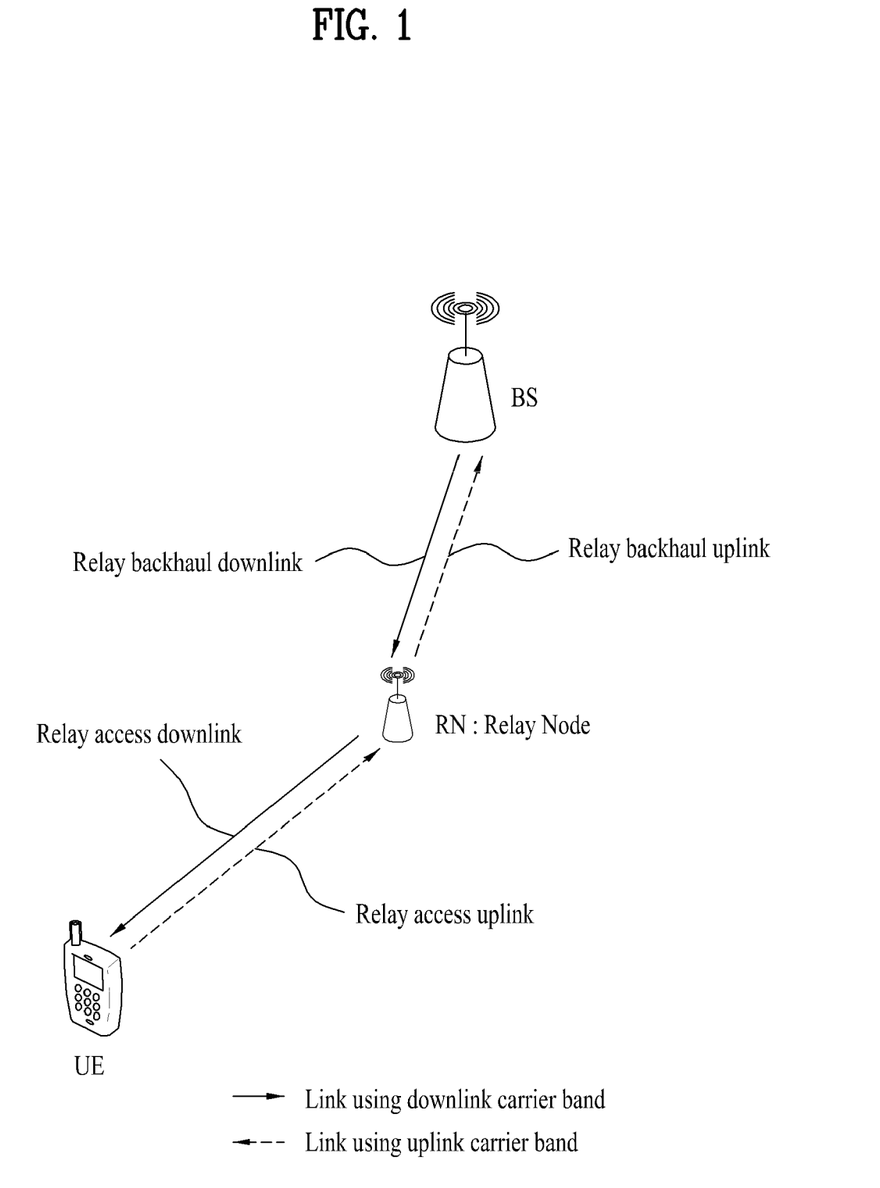
FIG. 1 illustrates the configuration of a relay backhaul link and a relay access link in a wireless communication system.

FIG. 1 illustrates the configuration of a relay backhaul link and a relay access link in a wireless communication system.

With the introduction of a function of relaying a signal on a link between an eNB and a UE to a Relay Node (RN), two links having different attributes apply to each of downlink and uplink carrier frequency bands in a 3GPP LTE-A system. A link between the eNB and the RN is defined as a backhaul link. A backhaul link through which a signal is transmitted using downlink resources in Frequency Division Duplex (FDD) or Time Division Duplex (TDD) is called a backhaul downlink, whereas a link through which a signal is transmitted using uplink resources in FDD or TDD is called a backhaul uplink.

Meanwhile, a link between an RN and a UE is defined as a relay access link. A relay access link through which a signal is transmitted in a downlink frequency band (in case of FDD) or in downlink subframe resources (in case of TDD) is called an access downlink, whereas a relay access link through which a signal is transmitted in an uplink frequency band (in case of FDD) or in uplink subframe resources (in case of TDD) is called an access uplink.

An RN may receive information from an eNB through a relay backhaul downlink and transmit information to the eNB through a relay backhaul uplink. In addition, the RN may transmit information to a UE through a relay access downlink and receive information from the UE through a relay access uplink.

The RN may perform initial cell search including acquisition of synchronization to the eNB. For the initial cell search, the RN may receive a synchronization channel from the eNB and then may synchronize its timing to the eNB and acquire a cell Identifier (ID) and other information from the received synchronization channel. Subsequently, the RN may receive a physical broadcast channel from the eNB and acquire broadcast information of a cell from the received physical broadcast channel. Meanwhile, the RN may receive a relay backhaul downlink Reference Signal (RS) and determine the channel state of the relay backhaul downlink from the relay backhaul downlink (RS) during the initial cell search. The RN may acquire more detailed system information by receiving a Relay-Physical Downlink Control CHannel (R-PDCCH) and/or a Relay-Physical Downlink Shared CHannel (R-PDSCH).

If the RN initially accesses the eNB or has no radio resources for signal transmission to the eNB, the RN may perform a random access procedure with the eNB. In the random access procedure, the RN may transmit a preamble on a Physical Random Access CHannel (PRACH) and receive a random access response message on an R-PDCCH and an R-PDSCH associated with the R-PDCCH.

In the case of contention-based random access except for handover, a contention resolution procedure may be performed, including transmission of an additional PRACH and reception of an additional R-PDCCH/R-PDSCH.

After the above-described procedure, the RN may receive an R-PDCCH/R-PDSCH and transmit a Relay-Physical Uplink Shared CHannel (R-PUSCH)/Relay-Physical Uplink Control CHannel (R-PUCCH) in a general uplink/downlink signal transmission procedure.

Control information that the RN transmits to the eNB on the uplink or the eNB receives from the RN on the uplink may include an ACKnowledgment/Negative ACKnowledgment (ACK/NACK) signal, a Channel Quality Indicator (CQI), a Precoding Matrix Index (PMI), a Rank Indicator (RI), etc. In the 3GPP LTE-A system, the RN may transmit control information such as a CQI, a PMI, an RI, etc. on the R-PUSCH/R-PUCCH.

Figure 2:
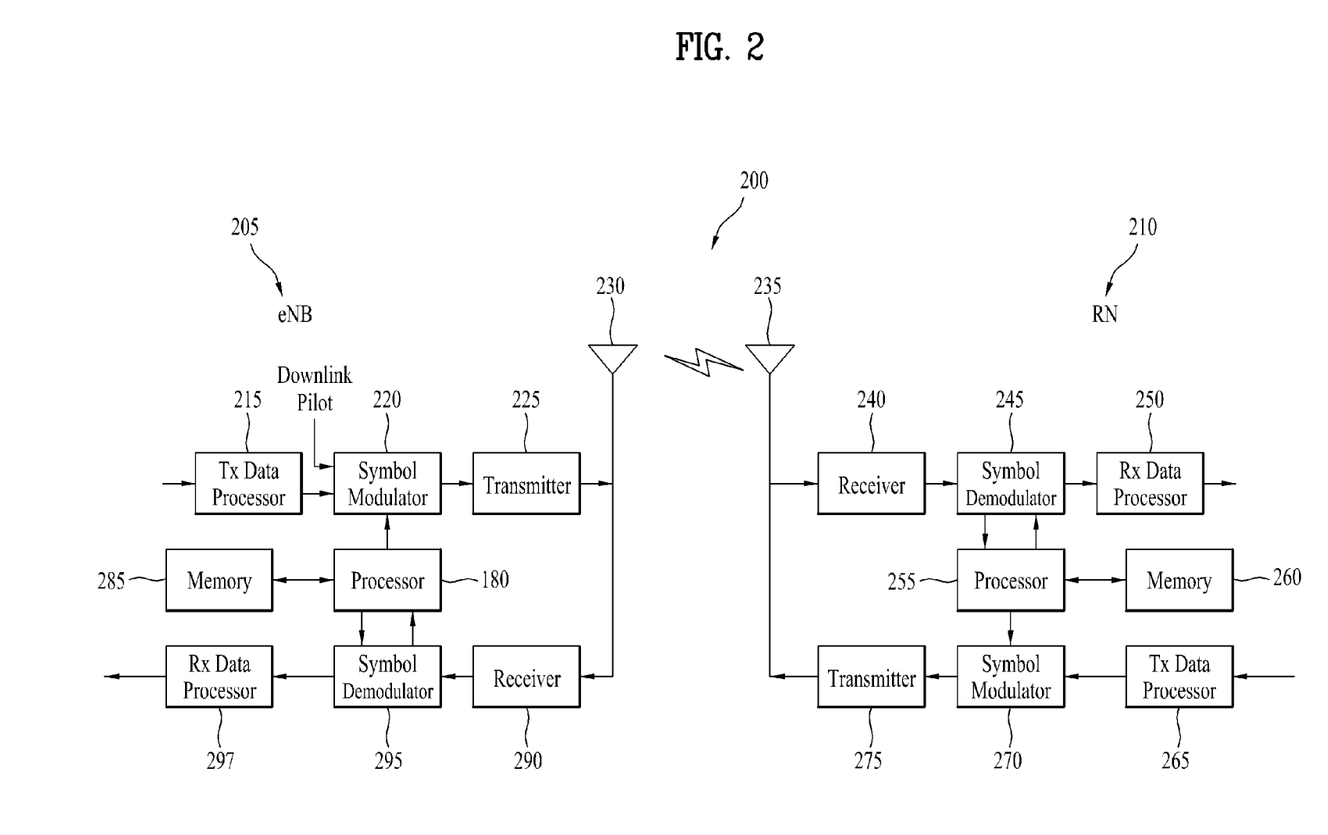
FIG. 2 is a block diagram of an evolved Node B (eNB) 205 and a Relay Node (RN) 210 in a wireless communication system 200.

FIG. 2 is a block diagram of an eNB 205 and an RN 210 in a wireless communication system 200.

While one eNB 205 and one RN 210 are shown in FIG. 2 to simplify the structure of the wireless communication system 200, the wireless communication system 200 may include one or more eNBs and/or one or more RNs.

Referring to FIG. 2, the eNB 205 may include a Transmission (Tx) data processor 215, a symbol modulator 220, a transmitter 225, a Tx and Reception (Rx) antenna 230, a processor 280, a memory 285, a receiver 290, a symbol demodulator 295, and an Rx data processor 297. The RN 210 may include a Tx data processor 265, a symbol modulator 270, a transmitter 275, a Tx and Rx antenna 235, a processor 255, a memory 260, a receiver 240, a symbol demodulator 245, and an Rx data processor 250. While each of the eNB 205 and the RN 210 is shown as having the single antenna 230 or 235, the eNB 205 and the RN 210 have a plurality of antennas. Accordingly, the eNB 205 and the RN 210 support Multiple Input Multiple Output (MIMO) according to the present invention. The eNB 205 may support both Single User-MIMO (SU-MIMO) and Multi User-MIMO (MU-MIMO).

On downlink, the Tx data processor 215 receives traffic data, formats the received traffic data, encodes the formatted traffic data, interleaves the coded traffic data, and modulates the interleaved traffic data (symbol mapping), thus producing modulation symbols ("data symbols"). The symbol modulator 220 receives the data symbols and pilot symbols, processes them, and outputs a sequence of symbols.

The symbol modulator 220 multiplexes the data symbols with the pilot symbols and transmits the multiplexed symbols to the transmitter 225. Each of the transmission symbols may be a data symbol, a pilot symbol, or a null value. The pilot symbols may be transmitted successively in each symbol period. The pilot symbols may be multiplexed in Frequency Division Multiplexing (FDM), Orthogonal Frequency Division Multiplexing (OFDM), Time Division Multiplexing (TDM), or Code Division Multiplexing (CDM).

The transmitter 225 receives the sequence of symbols, converts the received symbol sequence to one or more analog signals, and subjects the analog signals to additional processes (e.g. amplification, filtering, and frequency upconversion), thereby generating a downlink signal suitable for transmission on a radio channel. The downlink signal is transmitted to an RN through the antenna 230.

In the configuration of the RN 210, the antenna 235 receives a downlink signal from an eNB. The receiver 240 subjects the downlink signal received through the antenna 235 to processes (e.g. filtering, amplification, and frequency downconversion) and digitizes the processed signal, thus obtaining samples. The symbol demodulator 245 demodulates received pilot symbols and provides the demodulated pilot symbols to the processor 255, for channel estimation.

The symbol demodulator 245 also receives a frequency response estimate for the downlink from the processor 255, acquires data symbol estimates (i.e. estimates of transmitted data symbols) by demodulating received data symbols, and outputs the data symbol estimates to the Rx data processor 250. The Rx data processor 250 recovers transmitted traffic data by demodulating (symbol-demapping), deinterleaving, and decoding the data symbol estimates.

The operations of the symbol demodulator 245 and the Rx data processor 250 are complementary to those of the symbol modulator 220 and the Tx data processor 215 of the eNB 205.

On uplink, the Tx data processor 265 of the RN 210 processes traffic data and thus provides data symbols. The symbol modulator 270 multiplexes the data symbols received from the Tx data processor 265, modulates the multiplexed data symbols, and outputs a symbol sequence to the transmitter 275. The transmitter 275 generates an uplink signal by processing the symbol sequence. The uplink signal is transmitted to the eNB 205 through the antenna 235.

The eNB 205 receives the uplink signal from the RN 210 through the antenna 230. The receiver 290 acquires samples by processing the received uplink signal. The symbol demodulator 295 generates estimates of uplink pilot symbols and data symbols by processing the samples. The Rx data processor 297 recovers the traffic data transmitted by the RN 210 by processing the data symbol estimates.

The processors 255 and 280 of the RN 210 and the eNB 205 instruct (e.g. control, adjust, manage, etc.) operations of the RN 210 and the eNB 205, respectively. The processors 255 and 280 may be connected respectively to the memories 260 and 285 that store program codes and data. The memories 260 and 285 are connected to the processors 255 and 280 and store an Operating System (OS), applications, and general files.

The processors 255 and 280 may be called controllers, microcontrollers, microprocessors, microcomputers, etc. Meanwhile, the processors 255 and 280 may be achieved by various means, for example, hardware, firmware, software, or a combination thereof. In a hardware configuration, the processors 255 and 280 may be provided with Application Specific Integrated Circuits (ASICs), Digital Signal Processors (DSPs), Digital Signal Processing Devices (DSDPs), Programmable Logic Devices (PLDs), Field Programmable Gate Arrays (FPGAs), etc. which are configured to implement the present invention.

In a firmware or software configuration, an embodiment of the present invention may be implemented in the form of a module, a procedure, a function, etc. Firmware or software configured to implement the present invention may reside in the processors 255 and 280 or may be stored in the memories 260 and 285 and executed by the processors 255 and 280.

The layers of radio interface protocols between an RN/eNB and a wireless communication system (network) may be classified into Layers 1, 2 and 3 (L1, L2 and L3) based on the three lowest layers of the Open System Interconnection (OSI) model. A physical layer corresponds to L1 and provides information transfer service on physical channels. A Radio Resource Control (RRC) layer corresponds to L3 and provides radio control resources between a UE and the network. The RN/eNB may exchange RRC messages with the wireless communication network through the RRC layer.

Figure 3:
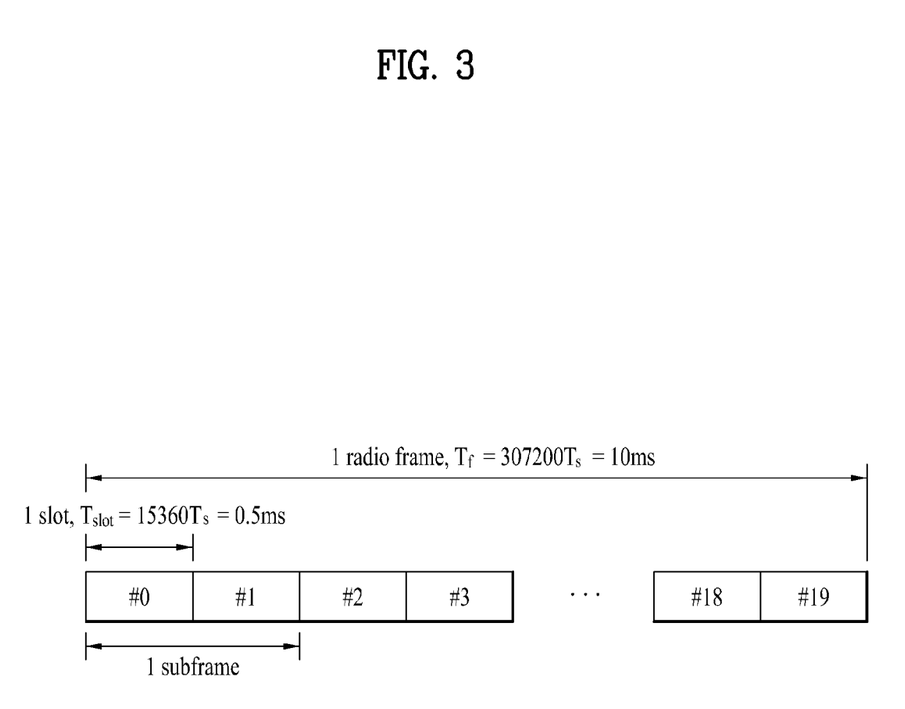
FIG. 3 illustrates the structure of a radio frame in a 3$^{rd}$ Generation Partnership Project Long Term Evolution (3GPP LTE) system as an exemplary mobile communication system.

FIG. 3 illustrates an exemplary structure of a radio frame in the 3GPP LTE system as an exemplary mobile communication system.

Referring to FIG. 3, a radio frame is 10 ms (327200 Ts) long and divided into 10 equal-sized subframes. Each subframe is 1 ms long and further divided into two slots. Each time slot is 0.5 ms (15360 Ts) long. Herein, Ts represents a sampling time and $Ts=1/(15 \text{ kHz} \times 2048)=3.2552 \times 10^{-8}$ (about 33 ns). A slot includes a plurality of OFDM symbols or Single Carrier Frequency Division Multiple Access (SC-FDMA) symbols in the time domain and a plurality of Resource Blocks (RBs) in the frequency domain.

In the LTE system, one RB includes 12 subcarriers by 7 (or 6) OFDM symbols or SC-FDMA symbols. A unit time in which data is transmitted is defined as Transmission Time Interval (TTI). The TTI may be defined as one or more subframes. The above-described radio frame structure is purely exemplary and thus the number of subframes in a radio frame, the number of slots in a subframe, or the number of OFDM or SC-FDMA symbols in a slot may vary.

Figure 4:
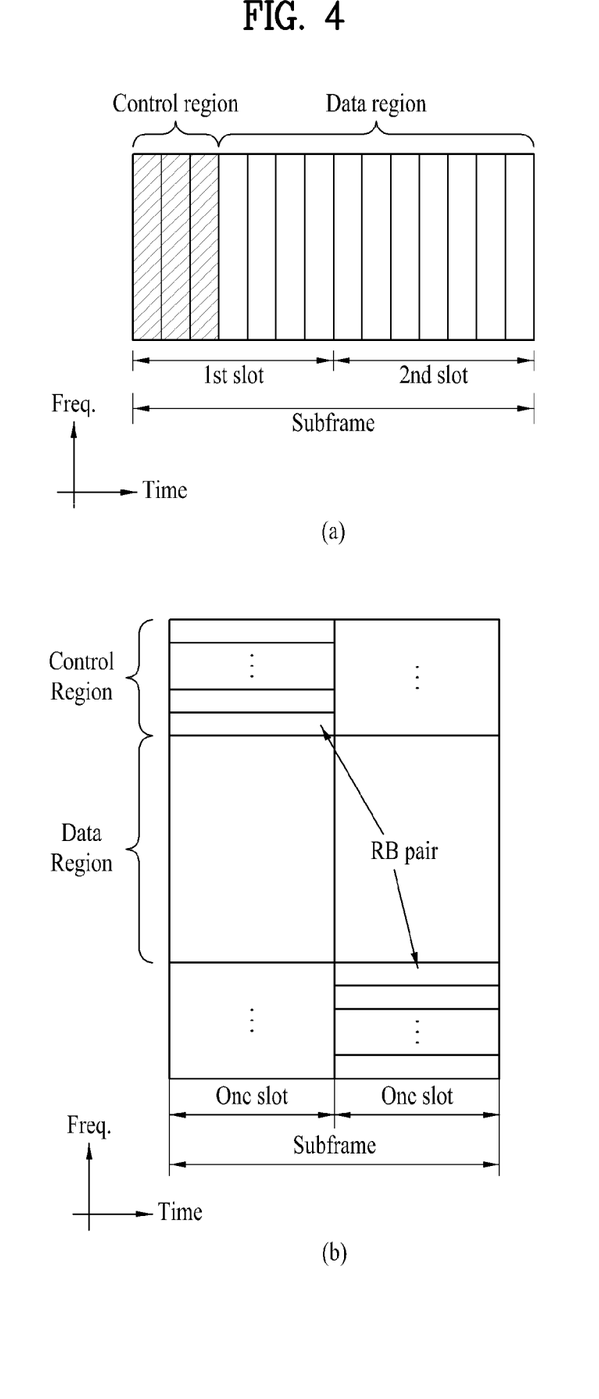
FIG. 4 illustrates the structures of a downlink subframe and an uplink subframe in the 3GPP LTE system as an exemplary mobile communication system.

FIG. 4 illustrates the structures of a downlink subframe and an uplink subframe in the 3GPP LTE system as an exemplary mobile communication system.

Referring to FIG. 4(a), a downlink subframe includes two slots in the time domain. Up to three OFDM symbols at the start of the first slot in the downlink subframe are used for a control region to which control channels are allocated and the other OFDM symbols of the downlink subframe are used for a data region to which a Physical Downlink Shared CHannel (PDSCH) is allocated.

Downlink control channels used in the 3GPP LTE system include a Physical Control Format Indicator CHannel (PCFICH), a Physical Downlink Control CHannel (PDCCH), and a Physical Hybrid automatic repeat reQuest (ARQ) Indicator CHannel (PHICH). The PCFICH is located in the first OFDM symbol of a subframe, carrying information about the number of OFDM symbols used for transmission of control channels (i.e. the size of the control region) in the subframe. Control information transmitted on the PDCCH is called Downlink Control Information (DCI). The DCI delivers uplink resource allocation information, downlink resource allocation information, and uplink Transmit Power Control (TPC) commands for UE groups. The PHICH delivers an HARQ ACKnowledgment/Negative ACKnowledgment (ACK/NACK) signal in response to an uplink transmission. That is, an ACK/NACK signal for uplink data transmitted by a UE is transmitted on the PHICH.

Now a description will be given of a downlink physical channel, PDCCH.

An eNB may transmit on the PDCCH a resource assignment and transport format for a PDSCH (a DL grant), a resource assignment for a PUSCH (a UL grant), a set of TPC commands for individual UEs of a UE group, Voice Over Internet Protocol (VoIP) activation information, etc. A plurality of PDCCHs may be transmitted in the control region. A UE may monitor a plurality of PDCCHs. The PDCCH includes an aggregate of one or more consecutive Control Channel Elements (CCEs) and may be transmitted in the control region after subblock interleaving. A CCE is a logical allocation unit for providing a coding rate to the PDCCH according to the state of a radio channel. The CCE corresponds to a plurality of Resource Element Groups (REGs). The format and number of available bits of the PDCCH may be determined according to the relationship between the number of CCEs and a coding rate provided by the CCEs.

Control information carried on the PDCCH is called DCI. [Table 1] below illustrates DCI according to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 conveys uplink resource allocation information, DCI format 1 to DCI format 2 are used to indicate downlink resource allocation information, and DCI format 3 and DCI format 3A indicate uplink TPC commands for UE groups.

Resource mapping for PDCCH transmission at an eNB in the LTE system will be described in brief.

In general, an eNB may transmit scheduling allocation information and other control information to a UE on a PDCCH. The PDCCH may be transmitted in an aggregate of one or more contiguous CCEs. A CCE includes 9 REGs. $N_{REG}$RBGs are not allocated to the PCFICH or PHICH. CCE 0 to CCE $N_{CCE}-1$ are available to the system ($N_{CCE}=\lfloor N_{REG}/9 \rfloor$). The PDCCH supports multiple formats as illustrated in [Table 2]. A PDCCH composed of n contiguous CCEs begins with a CCE corresponding to i mod n=0 (i is a CCE index). A plurality of PDCCHs may be transmitted in one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to [Table 2], the eNB may determine a PDCCH format according to the number of areas in which control information is to be transmitted. A UE may reduce overhead by reading control information on a CCE basis. Similarly, an RN may read control information on an R-CCE or CCE basis. In the LTE-A system, REs may be mapped to units of an R-CCE or CCE in order to transmit an R-PDCCH to an RN.

Referring to FIG. 4(b), an uplink subframe may be divided into a control region and a data region in the frequency domain. A Physical Uplink Control CHannel (PUCCH) carrying uplink control information is allocated to the control region and a Physical Uplink Shared CHannel (PUSCH) carrying user data is allocated to the data region. To maintain a single-carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Figure 5:
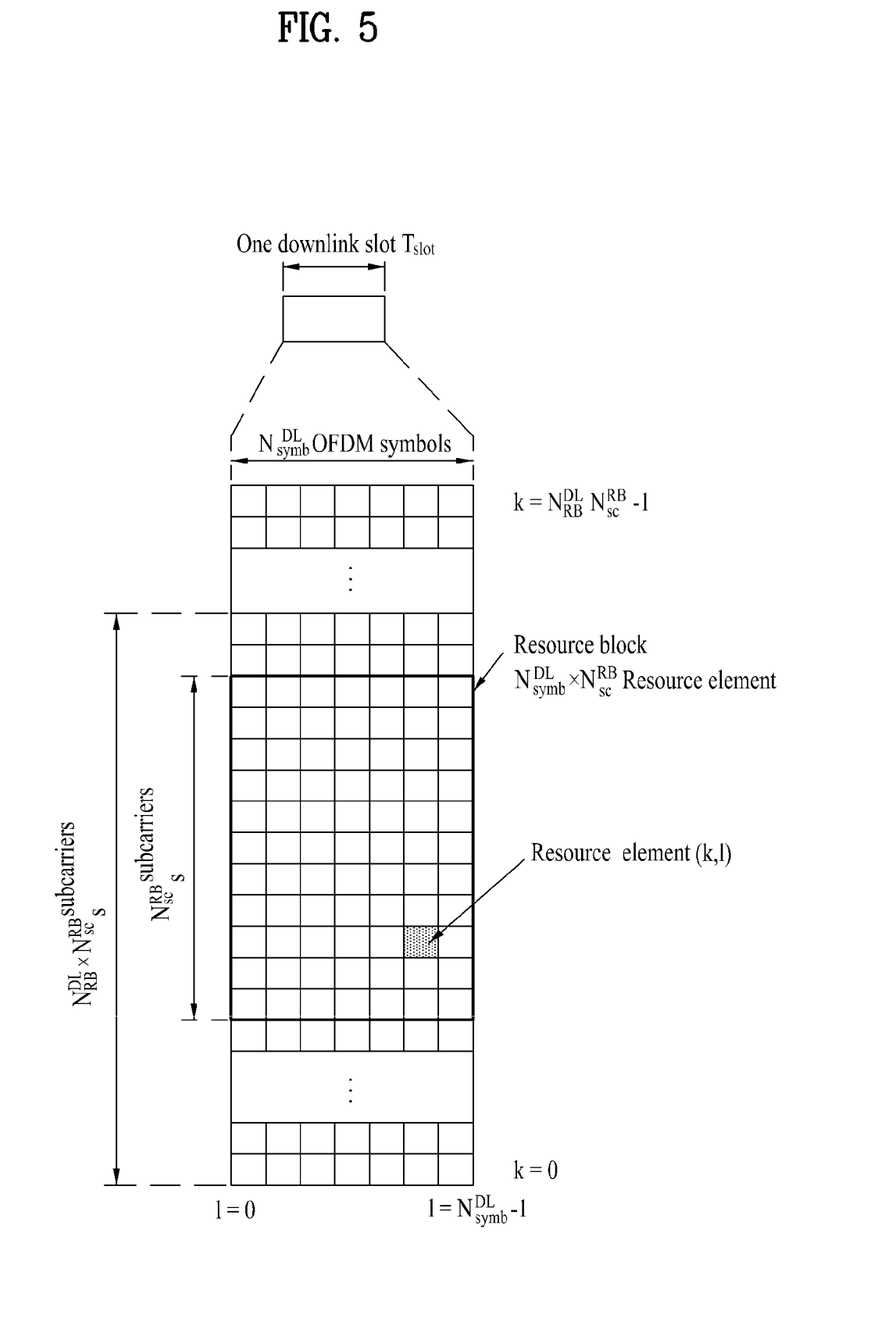
FIG. 5 illustrates the structure of a downlink time-frequency resource grid used in the present invention.

FIG. 5 illustrates the structure of a downlink time-frequency resource grid used in the present invention.

A downlink signal transmitted in each slot uses a resource grid including $N^{DL}_{RB} \times N^{RB}_{SC}$ subcarriers by $N^{DL}_{symb}$ OFDM symbols. Here, $N^{DL}_{RB}$ is the number of downlink RBs, $N^{RB}_{SC}$ is the number of subcarriers in one RB, and $N^{DL}_{symb}$ is the number of OFDM symbols in one downlink slot. The value of $N^{DL}_{RB}$ varies with a downlink transmission bandwidth set in a cell and it should satisfy $N^{min,DL}_{RB} \leq N^{DL}_{RB} \leq N^{max,DL}_{RB}$ where $N^{min,DL}_{RB}$ is a minimum downlink bandwidth supported by the wireless communication system and $N^{max,DL}_{RB}$ is a maximum downlink bandwidth supported by the wireless communication system. For example, $N^{min,DL}_{RB}=6$ and $N^{max,DL}_{RB}=110$ to which the present invention is not limited. The number of OFDM symbols per slot may be different according to a Cyclic Prefix (CP) length and a subcarrier spacing. For MIMO transmission, one resource grid may be defined for each antenna port.

Each element in the resource grid for each antenna port is called a Resource Element (RE), uniquely identified by an index pair (k, l) in a slot. Herein, k is a frequency-domain index and l is a time-domain index. k has a value ranging from 0 to $N^{DL}_{RB} N^{RB}_{SC} - 1$ and l has a value ranging from 0 to $N^{DL}_{symb} - 1$.

An RB illustrated in FIG. 5 is used to describe the mapping relationship between a physical channel and REs. RBs may be categorized into Physical Resource Block (PRB) and Virtual Resource Block (VRB). A PRB is defined by $N^{DL}_{symb}$ contiguous OFDM symbols in the time domain by $N^{RB}_{SC}$ contiguous subcarriers in the frequency domain. $N^{DL}_{symb}$ and $N^{RB}_{SC}$ may be preset. For example, $N^{DL}_{symb}$ and $N^{RB}_{SC}$ may be given as illustrated in [Table 3] below. Therefore, one PRB includes $N^{DL}_{symb} \times N^{RB}_{SC}$ REs. One PRB may correspond to one slot in the time domain and 180 kHz in the frequency domain, which should not be construed as limiting the present invention.

TABLE 3

| Configuration | | $N_{SC}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

A PRB has a number ranging from 0 to $N^{DL}_{RB}-1$. The relationship between a PRB number $n_{PRB}$ in the frequency domain and an RE (k, l) in a slot always satisfies.

The size of a VRB is equal to that of a PRB. VRBs may be classified into Localized VRB (LVRB) and Distributed VRB (DVRB). For each VRB type, a pair of VRBs located in the two slots of a subframe are labeled with the same single VRB number, $n_{VRB}$.

The VRB and PRB may be of the same size. VRBs may be classified into LVRB and DVRB. For each VRB type, a pair of VRBs may be labeled with the same VRB index (or the same VRB number) and allocated across the two slots of a subframe. In other words, one of indexes 0 to $N^{DL}_{RB}-1$ is assigned to each of $N^{DL}_{RB}$ VRBs in the first slot of a subframe and to each of $N^{DL}_{RB}$ VRBs in the second slot of the subframe.

The above-described radio frame, downlink subframe, uplink subframe, and downlink time-frequency resource grid structures illustrated in FIGS. 3, 4 and 5 are also applicable between an eNB and an RN.

An operation for transmitting a PDCCH to a UE by an eNB in the LTE system will be described below. The eNB determines a PDCCH format according to DCI to be transmitted to the UE and adds a Cyclic Redundancy Check (CRC) to control information. The CRC is masked by an ID known as a Radio Network Temporary Identifier (RNTI) according to the owner or usage of the PDCCH. If the PDCCH is directed to a specific UE, the CRC of the PDCCH may be masked by an ID of the UE. If the PDCCH is an R-PDCCH directed to a specific RN, the CRC of the PDCCH may be masked by an ID of the RN, for example, a Cell-RNTI (C-RNTI). If the PDCCH carries a paging message, the CRC of the PDCCH may be masked by a Paging Indicator Identifier (P-RNTI). If the PDCCH is a PDCCH or R-PDCCH carrying system information, its CRC may be masked by a system information ID, System Information RNTI (SI-RNTI). To indicate that the PDCCH carries a random access response to a random access preamble transmitted by a UE or an RN, its CRC may be masked by a Random Access-RNTI (RA-RNTI). [Table 4] illustrates examples of an ID by which the CRC of a PDCCH and/or R-PDCCH is masked.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If the C-RNTI is used, the PDCCH or R-PDCCH carries control information specific to a UE or an RN. If any other RNTI is used, the PDCCH or R-PDCCH carries common control information that all or a plurality of UEs or RNs within a cell are supposed to receive. The eNB generates code data by channel-encoding DCI attached with a CRC and rate-matches the coded data according to the number of CCEs allocated to a PDCCH or R-PDCCH format. Subsequently, the eNB generates modulation symbols by modulating the rate-matched coded data and maps the modulation symbols to physical REs.

According to the present invention, the term R-PDCCH refers to a backhaul physical downlink control channel for relay transmission from an eNB to an RN, and the term R-PUCCH refers to a backhaul physical uplink control channel for relay transmission from an RN to an eNB. The term R-PDSCH refers to a backhaul downlink physical data/shared channel for relay transmission and the term R-PUSCH refers to a backhaul uplink physical data/shared channel for relay transmission.

Now, a description will be given of RN types. With respect to an RN's usage of a frequency band (or spectrum), its operation can be classified into in-band and out-band. For an in-band RN, a backhaul link shares the same frequency band with an access link. If the backhaul link and the access link operate in different frequency bands, the RN is an out-band RN. In both in-band and out-band relaying, a UE operating in the conventional LTE system such as one conforming to Release-8 should be able to access a donor cell.

Depending on whether a UE is aware of the existence of an RN, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that self-controls a cell.

The former RN may have an RN ID, although it does not have its own cell ID. If at least a part of Radio Resource Management (RRM) of an RN is controlled by an eNB covering the donor cell, the RN is regarded as configured as a part of the donor cell, even though the other parts of the RRM reside in the RN. Preferably, this RN can support legacy UEs (e.g. LTE UEs). For instance, smart repeaters, decode-and-forward relays, L2 relays, and Type-2 relays form a part of a donor cell.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a macro eNB. Preferably, a cell controlled by this type of RN may support legacy UEs. For example, RNs of this type include self-backhauling RNs, L3 relays, Type-1 relays, and Type-1a relays.

A Type-1 relay is an in-band RN that controls a plurality of cells. Each of the plurality of cells appears to a UE as a separate cell distinct from a donor cell. The plurality of cells have their own physical cell IDs (as defined in LTE Release-8) and the RN can transmit its own synchronization channels, RSs, etc. During a single-cell operation, a UE may receive scheduling information and an HARQ feedback directly from the RN and transmit its control channels (a Scheduling Request (SR), a CQI, an ACK/NACK, etc.) to the RN. The Type-1 relay appears as a legacy eNB (operating in conformance to LTE Release-8) to a legacy UE (conforming to LTE Release-8). That is, the Type-1 relay has backward compatibility. On the other hand, to LTE-A UEs, the Type-1 relay appears different from a legacy eNB. Thus the Type-1 relay can enhance performance.

Except for its out-band operation, a Type-1a relay is characterized by the same set of features as the Type-1 relay. The Type-1a relay may be configured such that the influence of its operation on an L1 operation is minimized or eliminated.

A Type-2 relay is an in-band RN that does not have its own physical cell ID and thus does not form a new cell. Since the Type-2 relay is transparent to legacy UEs, the legacy UEs do not notice the existence of the Type-2 relay. The Type-2 relay can transmit a PDCCH but does not transmit at least a Common RS (CRS) and a PDCCH.

While it is assumed in the present invention that an RN is an in-band RN which is not capable of simultaneous bi-directional transmission and reception in the same frequency band, the present invention is not limited to in-band RNs. In order to allow in-band relaying, some resources in the time-frequency domain should be set aside for a backhaul link (Un) and these resources may be set not to be used for an access link (Uu). This is called resource partitioning.

A description will be given of the general principle of resource partitioning at an RN. A backhaul downlink and an access downlink may be TDM-multiplexed in one carrier frequency (that is, only one of the backhaul downlink and the access downlink is activated at a specific time). Similarly, a backhaul uplink and an access uplink may be TDM-multiplexed in one carrier frequency (that is, only one of the backhaul uplink and the access uplink is activated at a specific time).

Multiplexing of backhaul links in FDD is performed such that backhaul downlink transmission and backhaul uplink transmission take place in a downlink frequency band and an uplink frequency band, respectively. In comparison, multiplexing of backhaul links in TDD is performed such that backhaul downlink transmission and backhaul uplink transmission take place in a downlink subframe between an eNB and an RN and an uplink subframe between the eNB and the RN, respectively.

In case of an in-band RN, for example, if backhaul downlink reception from an eNB and access downlink transmission to a UE are performed simultaneously in the same frequency band, a signal transmitted from the transmitter of the RN may be received at the receiver of the RN. As a result, signal interference or Radio Frequency (RF) jamming may occur at the RF front-end of the RN. Likewise, if access uplink reception from a UE and backhaul uplink transmission to an eNB take place simultaneously in the same frequency band, the RF front-end of the RN may experience signal interference. Therefore, simultaneous eNB-to-RN and RN-to-UE transmissions in the same frequency band may not be feasible unless a reception signal and a transmission signal are sufficiently isolated from each other (e.g. a Tx antenna is geographically apart enough from an Rx antenna (e.g. on the ground/underground)).

One way to handle the signal interference is to operate the RN such that while the RN is receiving a signal from a donor cell, it is not transmitting signals to UEs. That is, a gap is created in the RN-to-UE transmission and UEs (including legacy UEs) are not supposed to expect any RN transmission during the gap. This gap may be created by configuring a Multicast Broadcast Single Frequency Network (MBSFN) subframe.

A method for allocating PUCCH resources for transmission of an HARQ ACK/NACK feedback in response to a PDSCH received from an eNB by a UE in the LTE system will be described.

In an FDD system, the UE may use PUCCH resources $n_{PUCCH}^{(1)}$ to transmit an HARQ ACK/NACK (or an HARQ ACK) in subframe n in response to a PDSCH transmission indicated by a PDCCH detected in subframe n−4. The PUCCH resources $n_{PUCCH}^{(1)}$ satisfy $n_{PUCCH}^{(1)}=n_{CCE}+N_{PUCCH}^{(1)}$ where $n_{PUCCH}^{(1)}$ is a resource index for PUCCH format 1/1a/1b and $n_{CCE}$ is the number of a first CCE (or a CCE having the lowest index) used for transmitting a DCI assignment. $N_{PUCCH}^{(1)}$ is a parameter configured by a higher layer. If a PDCCH is not detected in the subframe n−4, $n_{PUCCH}^{(1)}$ is determined according to a higher layer configuration, for transmission of the HARQ ACK/NACK from the UE in response to the PDSCH transmission.

As described above, PUCCH resources in which the UE will transmit an HARQ ACK/NACK feedback is affected by the lowest $n_{CCE}$ of the indexes of CCEs carrying DCI including resource allocation information for a corresponding PDSCH transmission in the LTE system. Along with the introduction of RNs to the LTE-A system, a new downlink control channel R-PDCCH was introduced, especially to support Type-1 in-band RNs. Although an R-PDCCH transmission method and a method for multiplexing an R-PDCCH with other downlink channels have not been specified yet, the concept of CCE may be introduced as a basic unit of transmitting an R-PDCCH on the assumption of the R-PDCCH basically has the same configuration as a PDCCH. In the present invention, the basic unit of transmitting an R-PDCCH will be referred to as an R-CCE distinguishably from a CCE of a PDCCH.

Because an in-band RN shares the same time-frequency resources between a backhaul link and an access link, there exists a need for a method for appropriately multiplexing the two links. In addition, to ensure backward compatibility with legacy LTE Rel-8 UEs, a gap is artificially created for backhaul data transmission, as described before.

Figure 6:
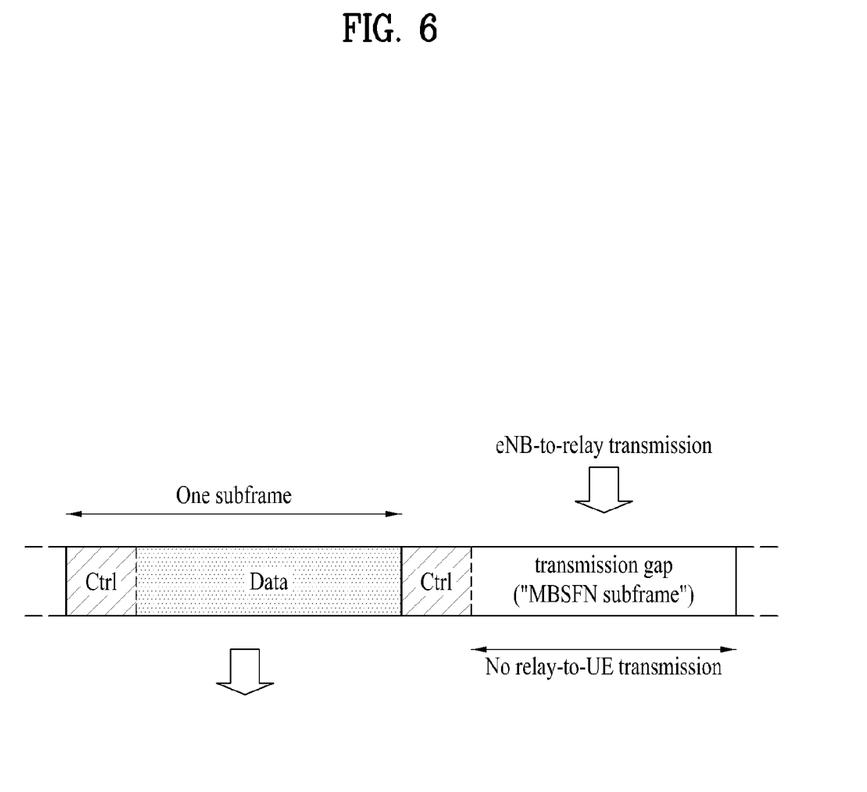
FIG. 6 illustrates an exemplary structure of a fake Multicast Broadcast Single Frequency Network (MBSFN) subframe for a relay backhaul link in an LTE-Advanced (LTE-A) system.

FIG. 6 illustrates an exemplary structure of a fake MBSFN subframe for a relay backhaul link in the LTE-A system.

Referring to FIG. 6, a "Ctrl" region carries control information that a UE should always receive. The other part corresponds to an MBSFN subframe in which the UE does not receive a CRS or other control signals. An eNB transmits backhaul data to an RN in this gap and transmits control information on an R-PDCCH to the RN in this area. The eNB transmits resource allocation information for downlink backhaul data in the control information.

An example of multiplexing an R-PDCCH with an R-PDSCH carrying backhaul data will be described below with reference to FIG. 7.

Figure 7:
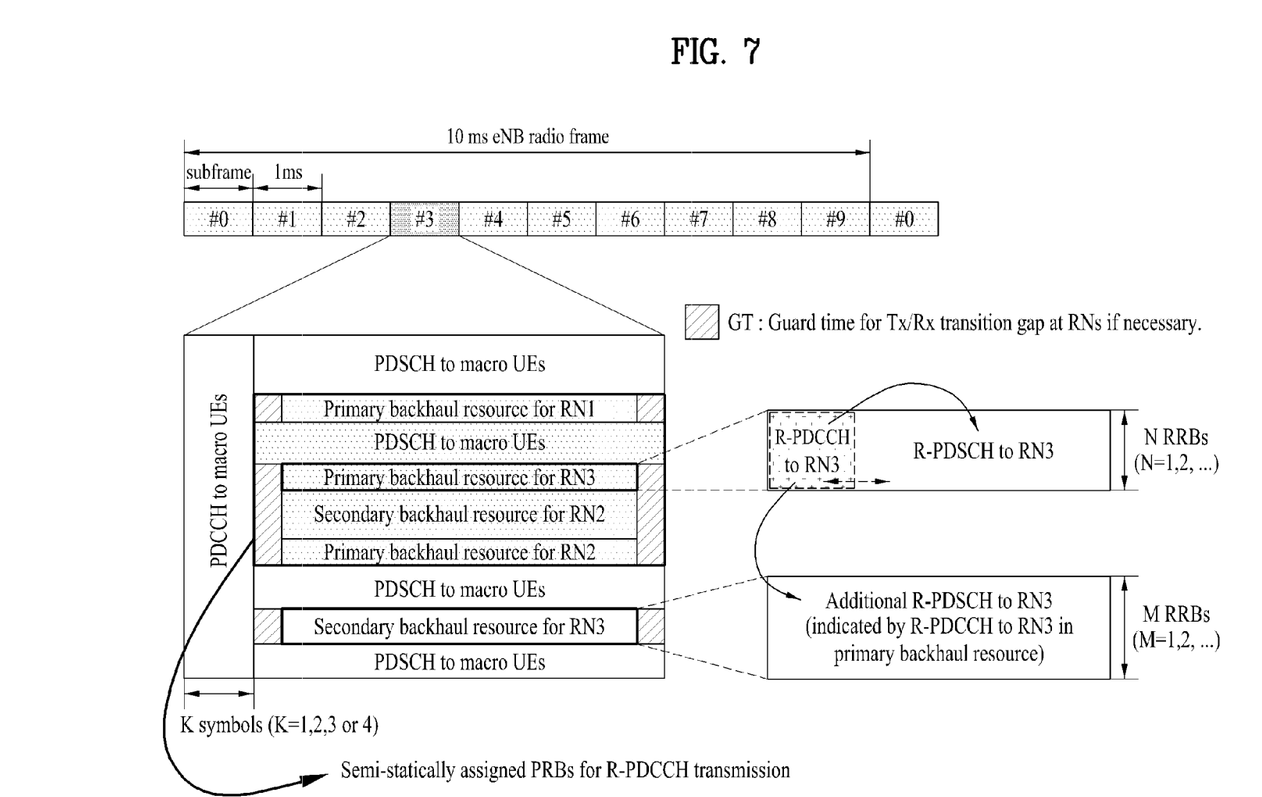
FIG. 7 illustrates an exemplary Relay-Physical Downlink Control CHannel (R-PDCCH) multiplexing method in the LTE-A system.

FIG. 7 illustrates an exemplary R-PDCCH multiplexing method in the LTE-A system.

Referring to FIG. 7, an R-PDCCH may be mapped along a time-frequency axis or the R-PDCCH may be configured to use up to the last symbol of a subframe along a time axis. The present invention is not limited to a specific method for multiplexing an R-PDCCH with an R-PDSCH.

Logical R-CCE indexing may be performed independently of CCE indexing of a PDCCH. In this case, the maximum number of R-CCEs that can be transmitted on an R-PDCCH may vary depending on whether an R-PHICH (i.e. a control channel for a downlink HARQ ACK/NACK feedback from an RN) is to be transmitted, what transmission scheme is used for the R-PHICH transmission, how an RS is configured for R-PDCCH demodulation, and how an R-PDCCH is multiplexed, as well as depending on semi-statically configured PRBs for R-PDCCH transmission, as illustrated in FIG. 7.

Therefore, regarding an R-PHICH transmission structure, an R-PDCCH Demodulation RS (DRS) configuration, and an R-PDCCH multiplexing scheme that are determined by a specific macrocell, the total number of R-CCEs is a value obtained by dividing the number of remaining REs resulting from excluding REs used for R-PHICH transmission (in the case where resources are separately allocated to an R-PHICH) from the total REs of semi-statically configured PRBs for R-PDCCH transmission by an R-CCE size. If this value is denoted by $N_{R\text{-}CCEmax}$, the R-CCEs may be indexed sequentially from 0 to $N_{R\text{-}CCEmax}-1$ according to the logical blinding order of R-PDCCCHs performed at the RN.

In this case, application of the same parameter to PUCCH resource allocation for an RN as to PUCCH resource allocation for a UE may lead to that the lowest $n_{CCE}$ of the indexes of CCEs of a PDCCH carrying PDSCH resource allocation information for the macro UE is equal to the lowest $n_{R\text{-}CCE}$ of the indexes of R-CCEs of an R-PDCCH carrying R-PDSCH resource allocation information for the RN. As a result, a PUCCH resource collision may occur between the macro UE and the RN.

That is, since the RN cannot receive a PDCCH area transmitted by the eNB, the RN does not know resources allocated to other UEs for uplink ACK/NACK transmission. If ACK/NACK resources are mapped using the lowest CCE index of the R-PDCCH for downlink backhaul data, the same resources as uplink ACK/NACK resources allocated to macro UEs are allocated to the RN, thereby causing a collision between the ACK/NACK resources.

Therefore, it is necessary to define a method for mapping uplink ACK/NACK resources for uplink ACK/NACK transmission from an RN in response to downlink backhaul data for the case where the RN uses the same PUCCH with a UE in the LTE-A system. To avert this problem, an R-CCE indexing method and a higher-layer signaling method may be considered.

First of all, along with introduction of RNs to the LTE-A system, the present invention provides an R-CCE indexing method to prevent collision between PUCCH resources used for an RN to feedback a HARQ ACK/NACK in response to an R-PDSCH transmission and PUCCH resources used for a macro UE.

Embodiment 1 (R-CCE indexing and associated PUCCH resource mapping)

In accordance with an embodiment of the present invention, an offset-based R-CCR indexing method is used. An offset $N_{offset}$ is defined as a parameter for R-CCE indexing so that R-CCEs are indexed from $N_{offset}$ to $N_{offset}+N_{R\text{-}CCEmax}-1$, rather than from 0 to $N_{offset}$ as described before. $N_{offset}$ is a semi-static value explicitly signaled to the RN by higher-layer signaling by the eNB or implicitly known to the RN. In this case, $N_{offset}$ is fixed in every subframe.

For example, $N_{offset}$ may be fixed to the maximum number of CCEs that can be transmitted in a PUCCH area determined according to the bandwidth of a cell, a PHICH duration, a CRS transmission structure, and a maximum Control Format Indicator (CFI) value (e.g. if a bandwidth (BW)<10 RBs, the CFI is 4 or if the BW>10 RBs, the CFI is 3). Or $N_{offset}$ may be a dynamic value that varies in every subframe. Then the eNB directly transmits $N_{offset}$ or a parameter with which to determine $N_{offset}$ to the RN on an R-PDCCH. For instance, $N_{offset}$ for a specific frame may be determined by the CFI of the subframe (e.g. if the BW<10 RBs, the CFI is 2, 3 or 4 or if the BW>10 RBs, the CFI is 1, 2 or 3). That is, the number of CCEs of a PDCCH area in every subframe is variable according to a CFI value even in a cell having the same BW, the same PHICH duration, and the same CRS transmission structure. In this manner, $N_{offset}$ may be set to the number of CCEs of a PDCCH determined according to the CFI of each subframe.

The eNB may signal $N_{offset}$ directly to the RN in an R-PDCCH area of every backhaul subframe or may signal a CFI value to the RN so that the RN may determine $N_{offset}$ according to the CFI value. The eNB may transmit $N_{offset}$ or a CFI value for each RN in REs at predetermined positions of an R-PDCCH in a fixed format so that all RNs may receive $N_{offset}$ or the CFI value, or may transmit $N_{offset}$ or a CFI value for each RN in R-PDCCH resource allocation information directed to the RN.

Embodiment 2 (PUCCH Resource Allocation Offset Setting by Higher-Layer Signaling)

As described before, a PUCCH resource value $n_{PUCCH}^{(1)}$ may be determined by $n_{PUCCH}^{(1)}=n_{CCE}+N_{PUCCH}^{(1)}$ in an FDD system. The eNB may set an offset between an RN and a macro UE regarding a value $N_{PUCCH}^{(1)}$ that the eNB transmits to the macro UE as a cell-specific parameter by higher-layer signaling. That is, the eNB may define a new parameter $N_{PUCCH}^{Offset}$, signal it to the RN, and define PUCCH resource allocation to the RN by $n_{PUCCH}^{(1)}=n_{CCE}+N_{PUCCH}^{Offset}$.

In another method, the eNB may define a new parameter $N_{PUCCH}^{(1)RN}$ rather than it uses the parameter $N_{PUCCH}^{(1)}$ configured for the macro UE and may signal the new parameter $N_{PUCCH}^{(1)RN}$ to the RN by higher-layer signaling. Then PUCCH resource allocation to the RN may be defined by $n_{PUCCH}^{(1)}=n_{CCE}+N_{PUCCH}^{(1)RN}$.

The parameters $N_{PUCCH}^{Offset}$ and $N_{PUCCH}^{(1)}$ may be RN-specific. In this case, the eNB may transmit the parameters to each RN by RN-specific higher-layer signaling. Or the parameters $N_{PUCCH}^{Offset}$ and $N_{PUCCH}^{(1)}$ may be cell-specific. In this case, the eNB may transmit the parameters to each RN by RN-specific higher-layer signaling or may broadcast the parameters to RNs by cell-specific higher-layer signaling.

Embodiment 3 (Dedicated PUCCH Resources Allocation for RN)

The eNB may allocate a dedicated PUCCH to an RN. In this case, the eNB may transmit PUCCH resource allocation information $n_{PUCCH}^{(1)}$ (or $n_{PUCCH}^{(1,p)}$) to each RN by higher-layer signaling. A processor 255 of the RN may determine resources for transmission of an HARQ feedback in response to a PDSCH transmission based on the PUCCH resource allocation information received from the eNB. The RN may transmit the HARQ feedback in the determined resources (i.e. resources indicated by the PUCCH resource allocation information) in response to the PDSCH transmission.

Embodiment 4

The eNB may transmit to an RN resource indexes used for ACK/NACK transmission in response to data on a control channel that allocates resources for the data transmission or a part of the resource indexes.

Specifically, when the eNB transmits resource allocation information for downlink backhaul data on an R-PDCCH, it notifies an RN of $n_{CCE}$ used for ACK/NACK information, thereby fundamentally avoiding resource collision between ACK/NACK transmissions from the RN and a macro UE.

Embodiment 5

The eNB may reserve resources for ACK/NACK information related to backhaul data by higher-layer signaling. For example, $N_{PUCCH}^{(1)}$ in the ACK/NACK resource mapping formula for a macro UE $n_{PUCCH}^{(1)}=n_{CCE}+N_{PUCCH}^{(1)}$ may be expressed as $N_{PUCCH}^{(1)}=N_{PUCCH}^{(1)'}+N_{PUCCH}^{backhaul}$. That is, an RN may use resources between $N_{PUCCH}^{(1)'}$ and $N_{PUCCH}^{(1)'}+N_{PUCCH}^{backhaul}$ for ACK/NACK feedback in response to backhaul data.

According to the foregoing embodiments of the present invention, even though an RN and a UE may transmit HARQ feedbacks on a PUCCH, there is no risk of collision between the HARQ feedbacks.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The apparatus and method for transmitting and receiving control information are industrially applicable to various communication systems such as 3GPP LTE, LTE-A, and IEEE 802 systems.

The invention claimed is:

1. A method for transmitting an uplink control channel by a wireless communication apparatus in a wireless communication system, the method comprising:
   receiving, from a base station through a higher layer signal, resource assignment information related to a transmission of an uplink control channel for a specific antenna port;
   receiving, from the base station, a downlink control channel including downlink data channel assignment information for the wireless communication apparatus;
   receiving, from the base station, a downlink data channel for the wireless communication apparatus based on the downlink control channel; and
   transmitting, to the base station, the uplink control channel for the specific antenna port based upon the resource assignment information related to the transmission of the uplink control channel for the specific antenna port.

2. The method of claim 1, wherein the uplink control channel comprises a physical uplink control channel (PUCCH).

3. The method of claim 1, wherein the specific antenna port corresponds to an antenna port p,
   wherein the resource assignment information comprises a resource index ($n_{PUCCH}^{(1,p)}$) for a PUCCH using the antenna port p.

4. The method of claim 3, wherein the resource index ($n_{PUCCH}^{(1,p)}$) is semi-statically received from the base station.

5. The method of claim 3, wherein the resource index ($n_{PUCCH}^{(1,p)}$) is wireless communication apparatus-specifically configured.

6. The method of claim 1, wherein the uplink control channel for the specific antenna port comprises a hybrid automatic repeat request (HARQ) feedback information associated with the downlink data channel.

7. A method for receiving an uplink control channel by a base station in a wireless communication system, the method comprising:
   transmitting, to a wireless communication apparatus through a higher layer signal, resource assignment information related to a transmission of an uplink control channel for a specific antenna port;

transmitting, to the wireless communication apparatus, a downlink control channel including downlink data channel assignment information for the wireless communication apparatus;

transmitting, to the wireless communication apparatus, a downlink data channel for the wireless communication apparatus based on the downlink control channel; and receiving, from the wireless communication apparatus, the uplink control channel for the specific antenna port based upon the resource assignment information related to the transmission of the uplink control channel for the specific antenna port.

8. The method of claim 7, wherein the uplink control channel comprises a physical uplink control channel (PUCCH).

9. The method of claim 7, wherein the specific antenna port corresponds to an antenna port p,
wherein the resource assignment information comprises a resource index ($n_{PUCCH}^{(1,p)}$) for a PUCCH using the antenna port p.

10. The method of claim 9, wherein the resource index ($n_{PUCCH}^{(1,p)}$) is semi-statically received from the base station.

11. The method of claim 9, wherein the resource index ($n_{PUCCH}^{(1,p)}$) is wireless communication apparatus-specifically configured.

12. The method of claim 7, wherein the uplink control channel for the specific antenna port comprises a hybrid automatic repeat request (HARQ) feedback information associated with the downlink data channel.

13. A wireless communication apparatus for transmitting an uplink control channel in a wireless communication system, the wireless communication apparatus comprising:
a receiver configured to:
receive, from a base station through a higher layer signal, resource assignment information related to a transmission of an uplink control channel for a specific antenna port;
receive, from the base station, a downlink control channel including downlink data channel assignment information for the wireless communication apparatus; and
receive, from the base station, a downlink data channel for the wireless communication apparatus based on the downlink control channel; and a transmitter configured to transmit, to the base station, the uplink control channel for the specific antenna port based upon the resource assignment information related to the transmission of the uplink control channel for the specific antenna port.

14. The wireless communication apparatus of claim 13, wherein the specific antenna port corresponds to an antenna port p,
wherein the resource assignment information comprises a resource index ($n_{PUCCH}^{(1,p)}$) for a PUCCH using the antenna port p.

15. The wireless communication apparatus of claim 14, wherein the resource index ($n_{PUCCH}^{(1,p)}$) is wireless communication apparatus-specifically configured.

16. A base station for receiving an uplink control channel in a wireless communication system, the base station comprising:
a transmitter configured to:
transmit, to a wireless communication apparatus through a higher layer signal, resource assignment information related to a transmission of an uplink control channel for a specific antenna port;
transmit, to the wireless communication apparatus, a downlink control channel including downlink data channel assignment information for the wireless communication apparatus; and
transmit, to the wireless communication apparatus, a downlink data channel for the wireless communication apparatus based on the downlink control channel; and a receiver configured to receive, from the wireless communication apparatus, the uplink control channel for the specific antenna port based upon the resource assignment information related to the transmission of the uplink control channel for the specific antenna port.

17. The base station of claim 16, wherein the specific antenna port corresponds to an antenna port p,
wherein the resource assignment information comprises a resource index ($n_{PUCCH}^{(1,p)}$) for a PUCCH using the antenna port p.

18. The base station of claim 16, wherein the resource index ($n_{PUCCH}^{(1,p)}$) is wireless communication apparatus-specifically configured.

* * * * *